US010880334B2

(12) United States Patent
Froelicher et al.

(10) Patent No.: US 10,880,334 B2
(45) Date of Patent: *Dec. 29, 2020

(54) APPARATUS AND METHOD FOR SECURELY CONNECTING TO A REMOTE SERVER

(71) Applicant: QUALCOMM Incorporated, San Diego, CA (US)

(72) Inventors: Jeffree Froelicher, San Diego, CA (US); Lalitha B. S. Suryanarayana, Palo Alto, CA (US); Giridhar Mandyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/445,957

(22) Filed: Jun. 19, 2019

(65) Prior Publication Data

US 2019/0306199 A1 Oct. 3, 2019

Related U.S. Application Data

(63) Continuation of application No. 16/150,122, filed on Oct. 2, 2018, now Pat. No. 10,375,117, which is a (Continued)

(51) Int. Cl.
*H04L 29/06* (2006.01)
*H04L 29/12* (2006.01)
*H04L 29/08* (2006.01)

(52) U.S. Cl.
CPC .......... *H04L 63/20* (2013.01); *H04L 61/1511* (2013.01); *H04L 63/06* (2013.01);
(Continued)

(58) Field of Classification Search
None
See application file for complete search history.

(56) References Cited

U.S. PATENT DOCUMENTS 6,289,382 B1 9/2001 Bowman-Amuah et al.
7,296,155 B1 11/2007 Trostle et al.
(Continued)

FOREIGN PATENT DOCUMENTS

CN 101132326 A 2/2008
CN 101719938 A 6/2010
(Continued)

OTHER PUBLICATIONS

Lu, Zhaohui; Liu, Jianing. Design and Implementation of Dynamic Domain Name System Based on BIND. 2009 International Symposium on Computer Network and Multimedia Technology. https://ieeexplore.ieee.org/stamp/stamp.jsp?tp=&arnumber=5374550 (Year: 2009).*

Yu, Keping et al. A Key Management Scheme for Secure Communications of Information Centric Advanced Metering Infrastructure in Smart Grid. IEEE Transactions on Instrumentation and Measurement, vol. 64, issue: 8. https://ieeexplore.ieee.org/stamp/stamp.jsp?tp=&arnumber=7138617 (Year: 2015).*

(Continued)

*Primary Examiner* — Jeremiah L Avery
(74) *Attorney, Agent, or Firm* — Loza & Loza, LLP (57) ABSTRACT

A method for securely connecting to a remote server that provides improved Internet security. In the method, a client receives a request to connect to a remote server associated with a domain name. The client, when resolving the domain name, determines whether the remote server supports at least one predetermined IP layer security protocol. The client performs a key exchange protocol with the remote server to generate at least one shared secret in response to determining that the remote server supports the at least one predetermined IP layer security protocol. The client connects to the remote server using the at least one shared secret in the IP layer security protocol.

20 Claims, 6 Drawing Sheets

Related U.S. Application Data continuation of application No. 15/052,736, filed on Feb. 24, 2016, now Pat. No. 10,091,243.

(52) U.S. Cl.
CPC .......... *H04L 63/164* (2013.01); *H04L 63/205* (2013.01); *H04L 67/02* (2013.01); *H04L 67/42* (2013.01)

(56) References Cited

U.S. PATENT DOCUMENTS

| | | | |
|---|---|---|---|
| 8,316,228 B2* | 11/2012 | Winslow | H04L 63/10 713/153 |
| 8,467,386 B2 | 6/2013 | Sarikaya et al. | |
| 8,953,798 B2 | 2/2015 | Rossi | |
| 9,288,658 B2 | 3/2016 | Weniger et al. | |
| 10,091,243 B2 | 10/2018 | Froelicher et al. | |
| 10,205,593 B2* | 2/2019 | Biesinger | H04L 9/0861 |
| 2002/0093915 A1 | 7/2002 | Larson et al. | |
| 2004/0098485 A1 | 5/2004 | Larson et al. | |
| 2004/0117657 A1* | 6/2004 | Gabor | H04L 63/061 726/4 |
| 2006/0165060 A1* | 7/2006 | Dua | G06Q 20/401 370/352 |
| 2007/0121596 A1* | 5/2007 | Kurapati | H04M 7/0078 370/356 |
| 2010/0188975 A1* | 7/2010 | Raleigh | H04L 41/0893 370/230.1 |
| 2011/0026435 A1* | 2/2011 | Weniger | H04L 61/2007 370/254 |
| 2014/0289794 A1* | 9/2014 | Raleigh | G06F 21/575 726/1 |
| 2014/0304785 A1* | 10/2014 | Kafle | H04L 61/1511 726/5 |
| 2015/0121078 A1 | 4/2015 | Fu et al. | |
| 2015/0222604 A1* | 8/2015 | Ylonen | H04L 63/10 713/171 |
| 2019/0036976 A1 | 1/2019 | Froelicher et al. | |

FOREIGN PATENT DOCUMENTS

| | | |
|---|---|---|
| CN | 101820351 A | 9/2010 |
| EP | 2933984 A1 | 10/2015 |
| WO | 2015028057 A1 | 3/2015 |

OTHER PUBLICATIONS

Rafiee, Hosnieh; Meinel, Christoph. A Secure, Flexible Framework for DNS Authentication in IPv6 Autoconfiguration. 2013 IEEE 12th International Symposium on Network Computing and Applications. https://ieeexplore.ieee.org/stamp/stamp.jsp?tp=&arnumber=6623658 (Year: 2013).*

Rafiee, Hosnieh et al. DNS Update Extension to IPv6 Secure Addressing. 2013 27th International Conference on Advanced Information Networking and Applications Workshops. https://ieeexplore.ieee.org/stamp/stamp.jsp?tp=&arnumber=6550509 (Year: 2013).*

Harkins D., "The Internet Key Exchange (IKE), rfc2409.txt", Network Working Group RFC 1717, Internet Society (ISOC) 4, Rue Des Falaises CH-1205, Geneva, Switzerland, CH, Nov. 30, 1998, XP015008193, 42 pages.

International Search Report and Written Opinion—PCT/US2017/016550—ISA/EPO—dated Mar. 24, 2017.

Keeney J., et al., "Runtime Semantic Interoperability for Gathering Ontology-based Network Context", 10th IEEE/IFIP Networks Operations and Management Symposium, 2006, https://ieeexplore.ieee.org/stamp/stamp.jsp?tp=&arnumber=1687538, pp. 56-65.

Marin R., et al., "Cryptographic Identity Based Solution for Fast Handover on EAP Wireless Networks," 9th IFIP International Conference on Mobile Wireless Communications Networks. https://ieeexplore.ieee.org/stamp/stamp.jsp?tp=&arnumber=4668178, 2007, pp. 46-50.

Stone G.N., et al., "Network Policy Languages: A Survey and a New Approach," IEEE Network, vol. 15 (1), URL: https://ieeexplore.ieee.org/stamp/stamp.jsp?tp=&arnumber=898818, 2001, pp. 10-21.

Travostino F., et al., "Towards an Active IP Accounting Infrastructure", Proceedings of the 2000 IEEE Third Conference on Open Architectures and Network Programming, OpenArch 2000, http://ieeexplore.ieee.org/stamp/stamp.jsp?tp=&arnumber=828132, pp. 45-54.

Ververidis C.N., et al., "Service Discovery for Mobile Ad Hoc Networks, a Survey of Issues and Techniques", IEEE communications Surveys, IEEE, New York, NY, US, vol. 10, No. 3, Jul. 1, 2008 (Jul. 1, 2008), XP011234560, pp. 30-45, ISSN, 1553-877X, DOI, DOI,10.1109/COMST.2008.4625803 p. 34, left-hand column, paragraph 4-p. 36 left-hand column, paragraph 2.

Zhou H., et al., "IPSem: A Service Approach for IP-Enabled Wireless Sensor Networks", Proceedings of the 4th nternational Conference on Ubiquitous Information Technologies & Applications, 2009, https://ieeexplore.ieee.org/stamp/stamp.jsp?tp=&arnumber=5405736, 6 pages.

* cited by examiner

APPARATUS AND METHOD FOR SECURELY CONNECTING TO A REMOTE SERVER

CROSS-REFERENCE TO RELATED APPLICATIONS

The present Application for Patent is a continuation to pending U.S. application Ser. No. 16/150,122, filed Oct. 2, 2018, titled "APPARATUS AND METHOD FOR SECURELY CONNECTING TO A REMOTE SERVER", which is a continuation of pending U.S. application Ser. No. 15/052,736, filed Feb. 24, 2016, and U.S. Pat. No. 10,091,243, issued Oct. 2, 2018 and assigned to the assignee hereof and hereby expressly incorporated by reference herein as if fully set forth below and for all applicable purposes.

The present invention relates generally to Internet security, and more particularly, to securely connecting to a remote server based on domain name resolution.

BACKGROUND

Field

Most web browsers indicate http or https for web connections based on the url the device is connected to. A user may determine if the application-layer connection is secure based on seeing 'https://' in the url and an icon indicating https is being used. When using other security protocols, such as end-to-end IPsec, to communicate with a server, there is no such indication by the browser. It is also difficult to force servers to enforce security policies in regards to how a user's data and sensitive information is protected and processed. Further, a Virtual Private Network (VPN) typically requires a user to first initiate client software before use.

There is therefore a need for an improved technique for securely connecting to a remote server at the IP layer.

SUMMARY

An aspect of the present invention may reside in a method for securely connecting to a remote server, comprising: receiving, by a client, a request to connect to a remote server associated with a domain name; determining, by the client when resolving the domain name, whether the remote server supports at least one predetermined IP layer security protocol when resolving the domain name; performing, by the client, a key exchange protocol with the remote server to generate at least one shared secret in response to determining that the remote server supports the at least one predetermined IP layer security protocol; and connecting, by the client, to the remote server using the at least one shared secret in the at least one predetermined IP layer security protocol In more detailed aspects of the invention, the client may determine that the remote server supports the at least one predetermined IP layer security protocol based on a top level domain of the domain name. Alternatively, the client may determine that the remote server supports the at least one predetermined IP layer security protocol based on validation of the domain name using communications with a Domain Name System (DNS) server. The communications with the DNS server may use a secure DNS protocol. The client may receive, from the DNS server, a DNS service record for the validated domain name including at least one parameter indicating the remote server supports the at least one predetermined IP layer security protocol.

In other more detailed aspects of the invention, the client may determine that the remote server supports the at least one predetermined IP layer security protocol based on the client determining that the domain name is in a list of trusted domain names supporting the at least one predetermined IP layer security protocol. In addition, the domain name may be resolved to an IP address.

Another aspect of the invention may reside in an apparatus for securely connecting to a remote server, comprising: means for receiving a request to connect to a remote server associated with a domain name; means for determining whether the remote server supports at least one predetermined IP layer security protocol when resolving the domain name; means for performing a key exchange protocol with the remote server to generate at least one shared secret in response to determining that the remote server supports the at least one predetermined IP layer security protocol; and means for connecting to the remote server using the at least one shared secret in the at least one predetermined IP layer security protocol.

Another aspect of the invention may reside in an apparatus, comprising: a processor configured to: receive a request to connect to a remote server associated with a domain name; determine whether the remote server supports at least one predetermined IP layer security protocol when resolving the domain name; perform a key exchange protocol with the remote server to generate at least one shared secret in response to determining that the remote server supports the at least one predetermined IP layer security protocol; and connect to the remote server using the at least one shared secret in the at least one predetermined IP layer security protocol.

Another aspect of the invention may reside in a computer-readable medium, comprising: code for causing a computer to receive a request to connect to a remote server associated with a domain name; code for causing the computer to determine whether the remote server supports at least one predetermined IP layer security protocol when resolving the domain name; code for causing the computer to perform a key exchange protocol with the remote server to generate at least one shared secret in response to determining that the remote server supports the at least one predetermined IP layer security protocol; code for causing the computer to connect to the remote server using the at least one shared secret in the at least one predetermined IP layer security protocol.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 2:
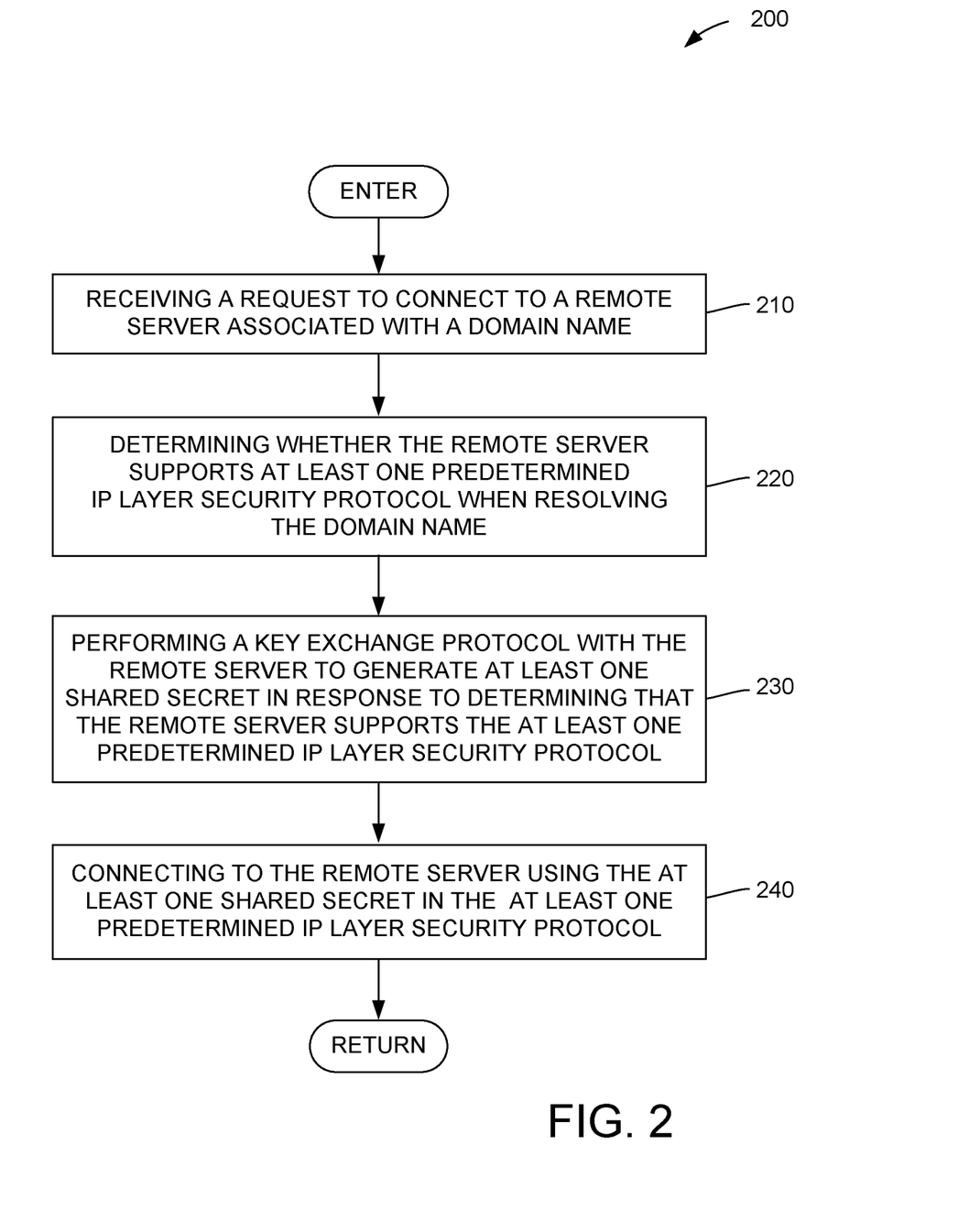
FIG. 2 is a flow diagram of a method for securely connecting to a remote server, according to the present invention.
Figure 3:
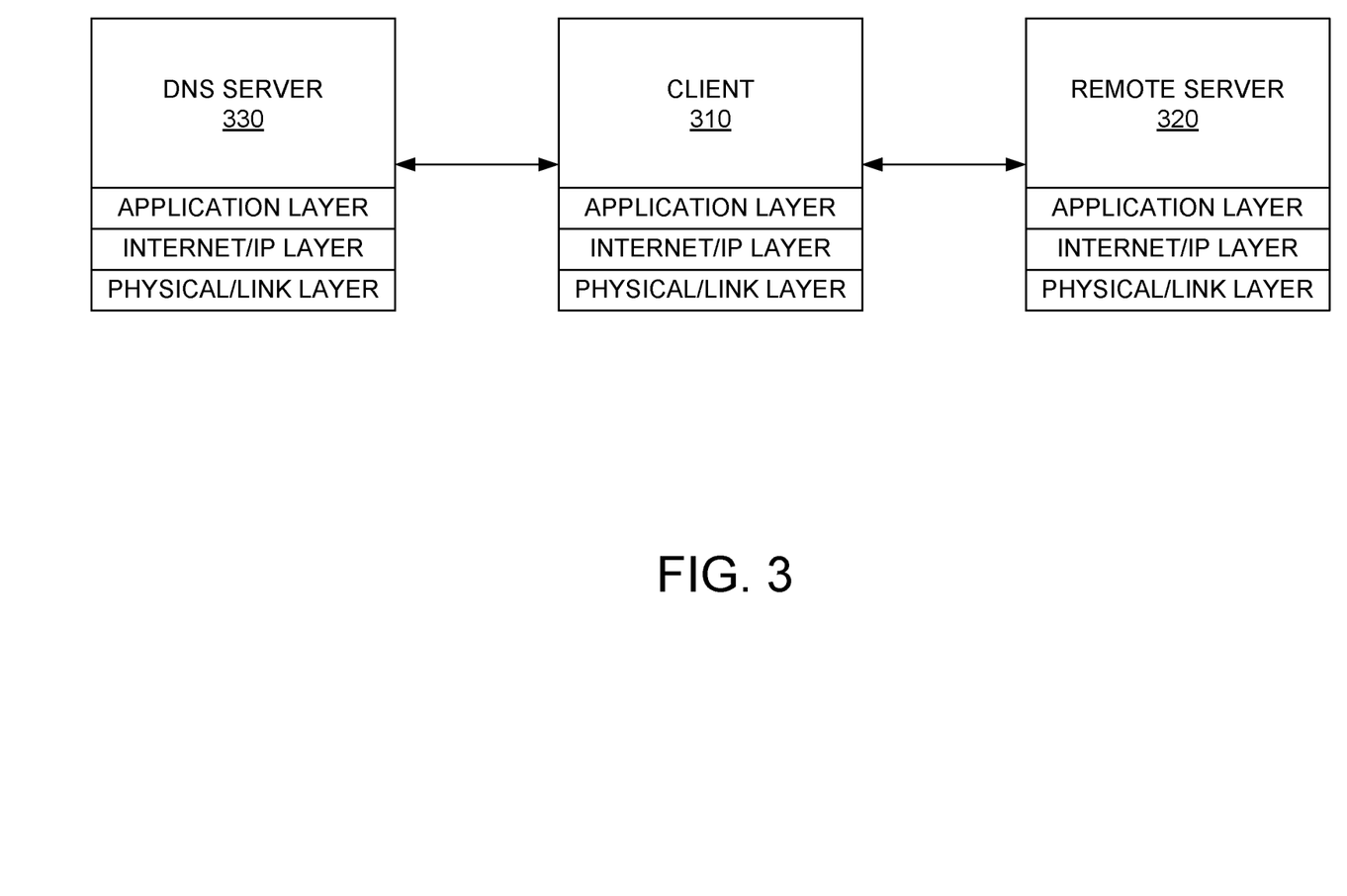
FIG. 3 is a block diagram of an embodiment of a system that allows a client to securely connect to a remote server.

With reference to FIGS. 2 and 3, an aspect of the present invention may reside in a method 200 for securely connecting to a remote server. In the method, a client 310 receives a request to connect to a remote server 320 associated with a domain name (step 210). The client, when resolving the domain name, determines whether the remote server supports at least one predetermined IP layer security protocol (step 220). The client performs a key exchange protocol with the remote server to generate at least one shared secret in response to determining that the remote server supports the at least one predetermined IP layer security protocol (step 230). The client connects to the remote server using the at least one shared secret in the at least one predetermined IP layer security protocol (step 240).

In more detailed aspects of the invention, the client 310 may determine that the remote server supports the at least one predetermined IP layer security protocol based on a top level domain of the domain name. For example, certain top level domains may be associated with supporting a predetermined IP layer security protocol, such a IPsec. Supporting top level domains may include .sec, .secure, .msec, .ipsec, .scom, and the like. A request including the domain name www-dot-example-dot-sec would indicate that the remote server associated with the domain name supports the predetermined IP layer security protocol, such as IPsec.

Alternatively, the client 310 may determine that the remote server 320 supports the at least one predetermined IP layer security protocol based on validation of the domain name using communications with a Domain Name System (DNS) server 330. The communications with the DNS server may use a secure DNS protocol, such as DNSsec. The client may receive, from the DNS server, a DNS service record for the validated domain name including at least one parameter indicating the remote server supports the at least one predetermined IP layer security protocol.

In other more detailed aspects of the invention, the client 310 may determine that the remote server 320 supports the at least one predetermined IP layer security protocol based on the client determining that the domain name is in a list of trusted domain names supporting the at least one predetermined IP layer security protocol. In addition, the domain name may be resolved to an IP address.

Figure 4:
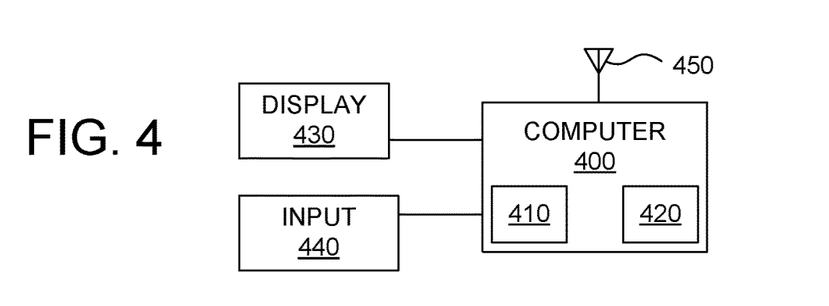
FIG. 4 is a block diagram of a computer including a processor and a memory.

With further reference to FIG. 4, the client 310 (e.g., remote station 102 (FIG. 1)) may comprise a computer 400 that includes a processor 410, a storage medium 420 such as memory and/or a disk drive, a display 430, and an input such as a keypad 440, and a wireless network/Internet connection 450. The processor may include a secure environment such as a trusted platform module (TPM).

Another aspect of the invention may reside in an apparatus 310 for securely connecting to a remote server, comprising: means (e.g., processor 410) for receiving a request to connect to a remote server 320 associated with a domain name; means (e.g., processor 410) for determining whether the remote server supports at least one predetermined IP layer security protocol when resolving the domain name; means (e.g., processor 410) for performing a key exchange protocol with the remote server to generate at least one shared secret in response to determining that the remote server supports the at least one predetermined IP layer security protocol; and means (e.g., processor 410) for connecting to the remote server using the at least one shared secret in the at least one predetermined IP layer security protocol.

Another aspect of the invention may reside in an apparatus 310, comprising: a processor 410 configured to: receive a request to connect to a remote server 320 associated with a domain name; determine whether the remote server supports at least one predetermined IP layer security protocol when resolving the domain name; perform a key exchange protocol with the remote server to generate at least one shared secret in response to determining that the remote server supports the at least one predetermined IP layer security protocol; and connect to the remote server using the at least one shared secret in the at least one predetermined IP layer security protocol.

Another aspect of the invention may reside in a computer-readable medium 420, comprising: code for causing a computer 400 to receive a request to connect to a remote server 320 associated with a domain name; code for causing the computer to determine whether the remote server supports at least one predetermined IP layer security protocol when resolving the domain name; code for causing the computer to perform a key exchange protocol with the remote server to generate at least one shared secret in response to determining that the remote server supports the at least one predetermined IP layer security protocol; code for causing the computer to connect to the remote server using the at least one shared secret in the at least one predetermined IP layer security protocol.

The client 310 may have an application layer, an Internet/IP layer, and a physical/link layer. In the OSI model, layer 7 may be associated with the application layer, layer 3 may be associated with the Internet/IP layer, and layers 1 and 2 may be associated with the physical/link layer. The remote server 320 and/or the DNS server 330 likewise may have an application layer, an Internet/IP layer, and a physical/link layer.

The techniques of the present invention may trigger/initiate secure IP layer protocols such as IPsec, and enforce certain security policies, based on, for example, domain name resolution. The techniques may leverage Internet Protocol version 6 (IPv6) with native IPsec using integrated IPv6 headers and additional headers as needed. The techniques may use transport mode IPsec for endpoint to endpoint communication (not the typical VPN IPsec). The transport mode IPsec may include an Authentication Header (AH) to ensure full packet integrity and origin authenticity (ICV) and identify security parameters (SPI), and prevent replay (SQN). Encapsulating Security Payload (ESP) may be used to ensure data confidentiality. At least AES-256 encryption may be used, and Internet Key Exchange (IKEv2) may be used to negotiate keys and parameters. DNSsec may provide initial X.509 certificates. Clients may have X.509 certificates with secure keys. A Diffie-Hellman Key Exchange may be performed to generate at least one share secret such as session keys, and the IPsec Security Association may use the shared secrets.

The transport mode IPsec may be implemented using particular Security Policy Descriptors (SPD) which establishes some predefined Security Associations (SA) to previously connected servers. IPsec SAs are native to the operating system and setup by IKE via operating system services or applications such as StrongSWAN, LibreSWAN, OpenSWAN, IPsec-Tools, and the like. IPv6 may include native IPsec.

Figure 5:
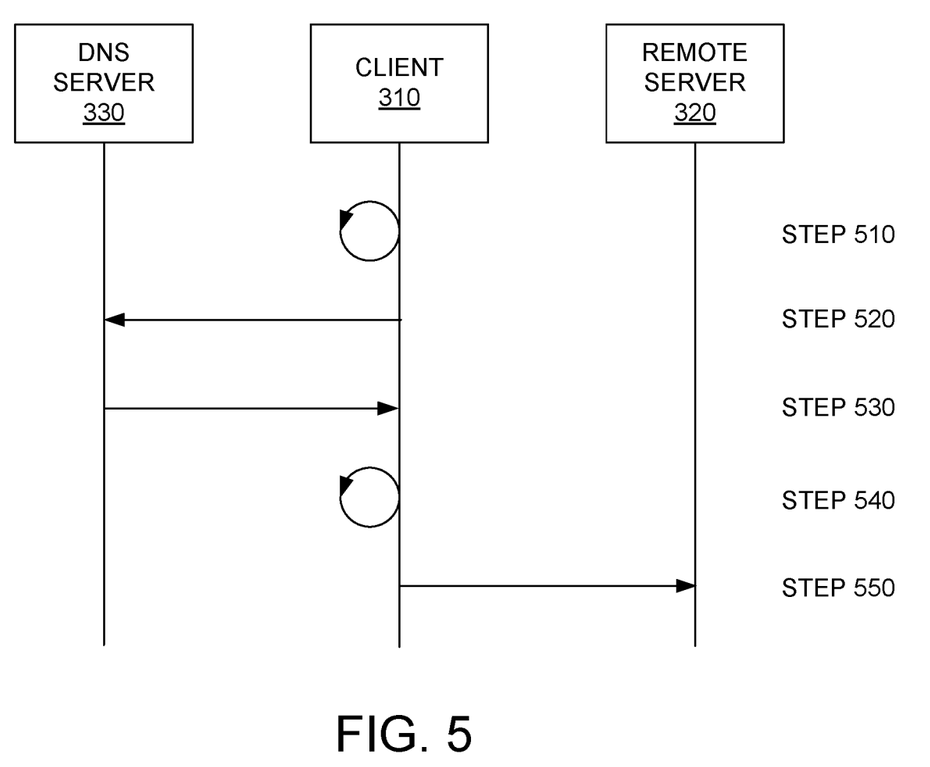
FIG. 5 is a block diagram of a method for securely connecting to a remote server.

In an example shown with reference to FIG. 5, the client 310, through a web browser or application, may initiate a connection to a specific top-level domain (TLD) such as '.sec' for the website www-dot-url-dot-sec which the client resolver would take as indication IPsec Security Associations may be needed (step 510). All Fully Qualified Domain Names assigned under such TLDs would be certified to meet certain security and privacy requirements as established by the owner of the TLD. The FQDN is validated and resolved. The client may require DNSsec verification for the TLD using the DNS server 330 (step 520 and 530). The client checks the path, and downloads and validates the X.509 certificate from the remote server 320 and any root Certificate Authorities (CAs) for that TLD. The client's DNS resolver may validate that the conditions for establishing IPsec have been met and verified (step 540). Thus, the client may use the validated TLD to determine 'interesting traffic' and initiate an IPsec connection to the remote server 320 associated with the domain name url.sec (step 550). Note that determining whether the remote server supports at least one predetermined IP layer security protocol when resolving the domain name may comprise the requesting step 520, the receiving step 530, and the validating step 540. The client may establish the IPsec connection by initiating IKE or IKEv2 with the remote server. An IKEv2 handshake may be used to generate one or more shared secrets to establish an end-to-end secure connection between the client and the remote server. Both parties, by using the TLD, agree to at least one predetermined IPsec/ISAKMP configuration and protocol thereby simplifying the setup process. Because the TLD certification enforces certain policies (i.e., via Certification from a Certificate Authority), a user knows the client is connected securely and the transferred data will be handled by the remote server in accordance to the policies needed for certification. A similar technique could be applied to the subdomain (sec.domain.com) if the signed certificate included the same root CA.

Figure 6:
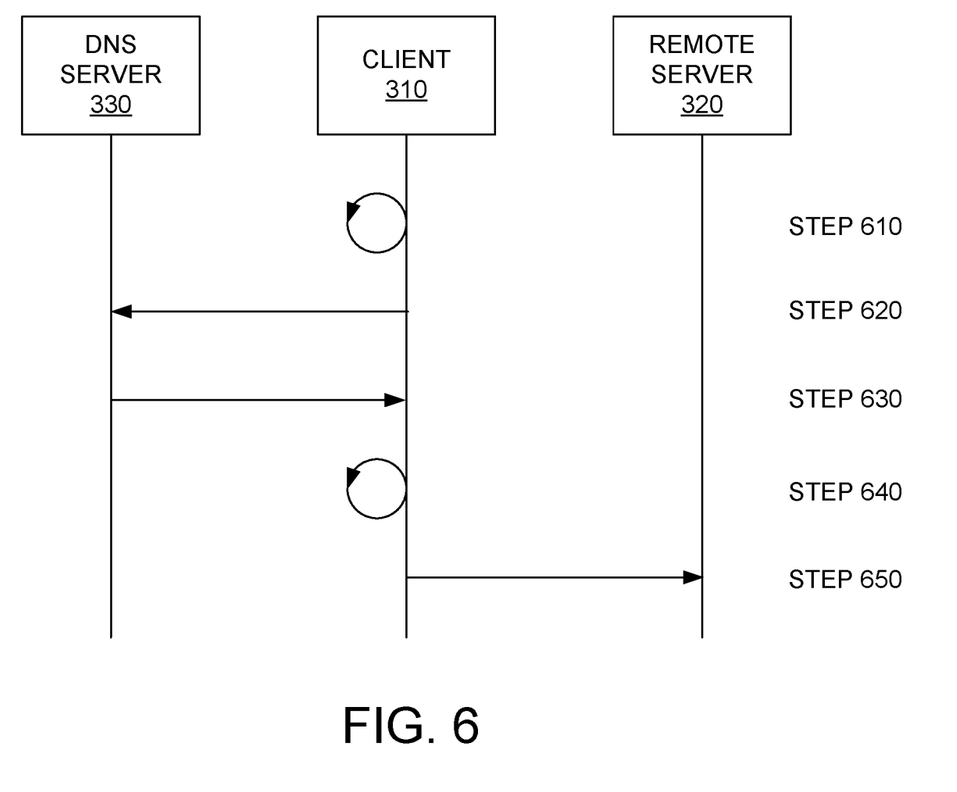
FIG. 6 is a block diagram of another method for securely connecting to a remote server.

In another example shown with reference to FIG. 6, the client 310 may initiate a connection to a trusted remote server 320 from a browser or application using a typical URL (step 610). The DNS resolution with the DNS server 330 may contain the IP address (IPv6), DNSsec verification, a DANE X.509 certificate, and a DNS Service Record (SRV service record) that indicates the remote server supports a certain security protocol such as IKE and IPsec (steps 620 and 630). The client's DNS resolver may validate that the conditions for establishing IPsec have been met and verified (step 640). Both the client and the remote server, by using the service record, agree to some predefined IKE/IPsec configurations and protocols, thereby simplifying the setup process. Because the service record and root CA enforce certain policies, the client is connected securely and user data will be handled by the remote server in accordance to the policies needed for certification (step 650). The client may establish the IPsec connection by initiating IKE or IKEv2 with the remote server.

Figure 7:
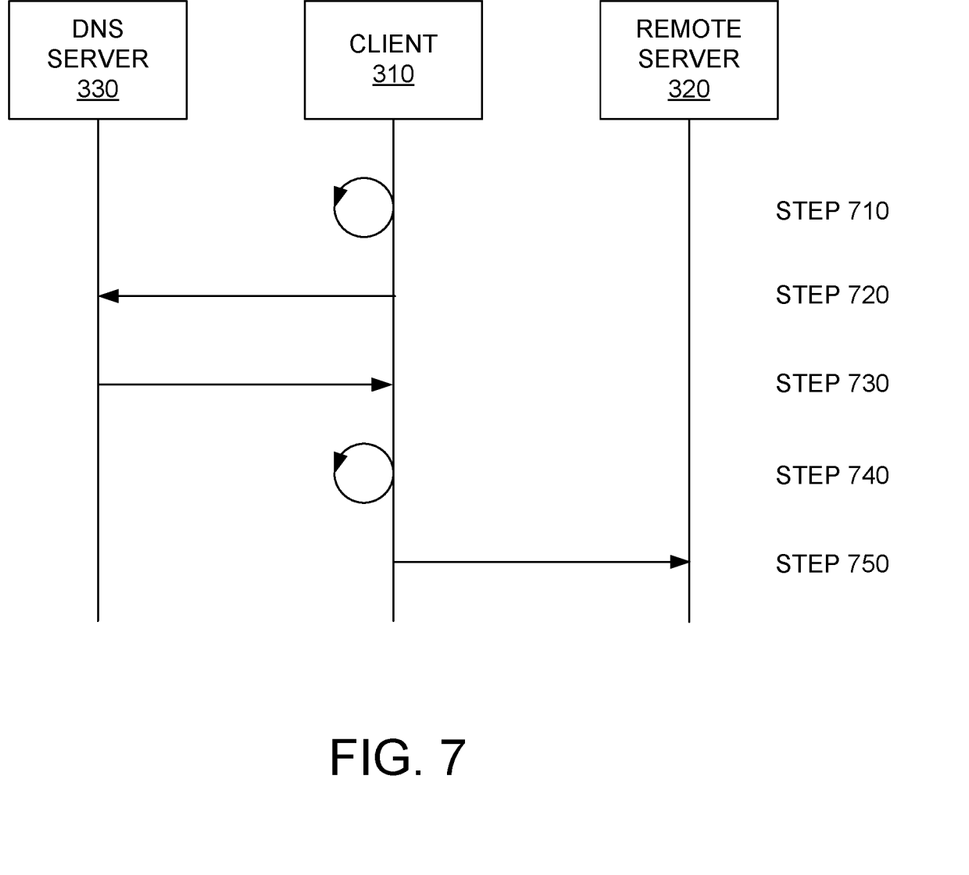
FIG. 7 is a block diagram of another method for securely connecting to a remote server.

In another example shown with reference to FIG. 7, the client 310 may initiate a connection based on the url of a trusted server 320 (step 710). The url (i.e., FQDN) is validated and resolved to an IP address. A list of supported FQDNs is preconfigured to indicate which remote servers agree to some predefined IKE/IPsec configurations and protocols, thereby simplifying the setup process. A DNS request and response verifies the IP address matches pre-stored value (steps 720 and 730). The FQDN matches a supported FQDN in the list. The client may validate that the conditions for establishing IPsec have been met and verified (step 740). Because these predefined FQDN lists and root CA validation require/enforce certain policies, the client is connected securely and user data will be handled by the server in accordance to the policies needed for certification (step 750). The client may establish the IPsec connection by initiating IKE or IKEv2 with the remote server.

Unlike application layer connection security, such as SSL or TLS when a web browser uses https, the IP layer security protocol may provide IP layer security protection. Also, unlike an application layer Virtual Private Network (VPN), the IP layer security protocol may be automatically triggered for a remote server 320 without requiring user intervention or initiation. Instead, the IP layer security protocol may be triggered in response to determining, by the client 310 when resolving the domain name, that the remote server 320 supports the IP layer security protocol.

Figure 1:
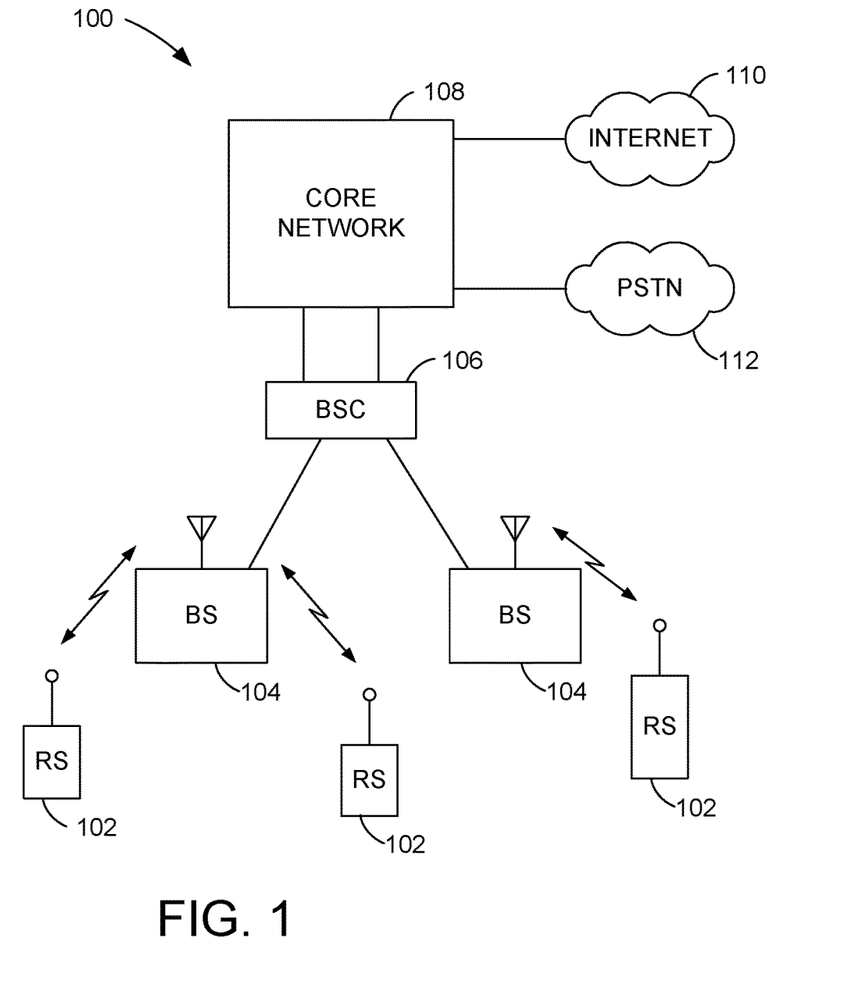
FIG. 1 is a block diagram of an example of a wireless communication system.

With reference to FIG. 1, a wireless remote station (RS) 102 (e.g. a mobile station MS) may communicate with one or more base stations (BS) 104 of a wireless communication system 100. The wireless communication system 100 may further include one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. The wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both non-transitory computer-readable storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for securely connecting to a remote server, comprising:
   receiving, by a client, a request to connect to a remote server associated with a domain name;
   in response to receiving the request to connect to the remote server associated with the domain name, obtaining a Domain Name System (DNS) resolution from a Domain Name System (DNS) server,
      the DNS resolution obtained from the DNS server including an Internet Protocol (IP) address for the remote server,
      the DNS resolution obtained from the DNS server further including a service (SRV) record,
      the SRV record included in the DNS resolution obtained from the DNS server including at least one parameter indicating that the remote server supports at least one security protocol;
   determining, by the client, that the remote server supports the at least one security protocol based on the at least one parameter indicating that the remote server supports the at least one security protocol included in the SRV record included in the DNS resolution obtained from the DNS server;
   performing, by the client, a key generation protocol with the remote server to generate at least one shared secret in response to determining that the remote server supports the at least one security protocol; and
   connecting, by the client, to the remote server using a key that is based on the at least one shared secret in the at least one security protocol.

2. The method of claim 1, wherein the DNS resolution is obtained from the DNS server using a secure DNS protocol.

3. The method of claim 1, wherein the at least one security protocol includes transport mode Internet Protocol security.

4. The method of claim 3, wherein the transport mode Internet Protocol security includes an Authentication Header (AH) to ensure full packet integrity, origin authenticity (ICV), identify security parameters (SPI), and sequence numbering (SQN) for replay prevention.

5. The method of claim 1, wherein the at least one security protocol provides endpoint to endpoint communication.

6. The method of claim 1, wherein the at least one security protocol uses Security Policy Descriptors (SPD) which establish predefined Security Associations (SA) to previously connected servers.

7. The method of claim 1, wherein the request to connect to the remote server associated with the domain name is a request from a browser using a Uniform Resource Locator (URL) that includes the domain name associated with the remote server.

8. An apparatus for securely connecting to a remote server, comprising:
   means for receiving a request to connect to a remote server associated with a domain name;
   means for, in response to receiving the request to connect to the remote server associated with the domain name, obtaining a Domain Name System (DNS) resolution from a Domain Name System (DNS) server,
      the DNS resolution obtained from the DNS server including an Internet Protocol (IP) address for the remote server,
      the DNS resolution obtained from the DNS server further including a service (SRV) record,
      the SRV record included in the DNS resolution obtained from the DNS server including at least one parameter indicating that the remote server supports at least one security protocol;

means for determining that the remote server supports the at least one security protocol when resolving the domain name based on the at least one parameter indicating that the remote server supports the at least one security protocol included in the SRV record included in the DNS resolution obtained from the DNS server;

means for performing a key generation protocol with the remote server to generate at least one shared secret in response to determining that the remote server supports the at least one security protocol; and means for connecting to the remote server using a key that is based on the at least one shared secret in the at least one security protocol.

9. The apparatus of claim 8, wherein the DNS resolution is obtained from the DNS server using a secure DNS protocol.

10. The apparatus of claim 8, wherein the at least one security protocol includes transport mode Internet Protocol security.

11. The apparatus of claim 10, wherein the transport mode Internet Protocol security includes an Authentication Header (AH) to ensure full packet integrity, origin authenticity (ICV), identify security parameters (SPI), and sequence numbering (SQN) for replay prevention.

12. The apparatus of claim 8, wherein the request to connect to the remote server associated with the domain name is a request from a browser using a Uniform Resource Locator (URL) that includes the domain name associated with the remote server.

13. An apparatus, comprising:
a processor configured to:
receive a request to connect to a remote server associated with a domain name;
in response to receiving the request to connect to the remote server associated with the domain name, obtain a Domain Name System (DNS) resolution from a Domain Name System (DNS) server,
the DNS resolution obtained from the DNS server including an Internet Protocol (IP) address for the remote server,
the DNS resolution obtained from the DNS server further including a service (SRV) record,
the SRV record included in the DNS resolution obtained from the DNS server including at least one parameter indicating that the remote server supports at least one security protocol;
determine that the remote server supports the at least one security protocol when resolving the domain name based on the at least one parameter indicating that the remote server supports the at least one security protocol included in the SRV record included in the DNS resolution obtained from the DNS server;
perform a key generation protocol with the remote server to generate at least one shared secret in response to determining that the remote server supports the at least one security protocol; and
connect to the remote server using a key that is based on the at least one shared secret in the at least one security protocol.

14. The apparatus of claim 13, wherein the DNS resolution is obtained from the DNS server using a secure DNS protocol.

15. The apparatus of claim 13, wherein the at least one security protocol includes transport mode Internet Protocol security.

16. The apparatus of claim 13, wherein the request to connect to the remote server associated with the domain name is a request from a browser using a Uniform Resource Locator (URL) that includes the domain name associated with the remote server.

17. A non-transitory computer-readable medium, comprising:
code for causing a computer to receive a request to connect to a remote server associated with a domain name;
code for causing the computer to, in response to receiving the request to connect to the remote server associated with the domain name, obtain a Domain Name System (DNS) resolution from a Domain Name System (DNS) server,
the DNS resolution obtained from the DNS server including an Internet Protocol (IP) address for the remote server,
the DNS resolution obtained from the DNS server further including a service (SRV) record,
the SRV record included in the DNS resolution obtained from the DNS server including at least one parameter indicating that the remote server supports at least one security protocol;
code for causing the computer to determine that the remote server supports the at least one security protocol when resolving the domain name based on the at least one parameter indicating that the remote server supports the at least one security protocol included in the SRV record included in the DNS resolution obtained from the DNS server;
code for causing the computer to perform a key generation protocol with the remote server to generate at least one shared secret in response to determining that the remote server supports the at least one security protocol; and
code for causing the computer to connect to the remote server using a key that is based on the at least one shared secret in the at least one security protocol.

18. The non-transitory computer-readable medium of claim 17, wherein the DNS resolution is obtained from the DNS server using a secure DNS protocol.

19. The non-transitory computer-readable medium of claim 17, wherein the at least one security protocol includes transport mode Internet Protocol security.

20. The non-transitory computer-readable medium of claim 17, wherein the request to connect to the remote server associated with the domain name is a request from a browser using a Uniform Resource Locator (URL) that includes the domain name associated with the remote server.

* * * * *